April 6, 1948.  R. E. CUMMINGS  2,439,240
BRACED HEAD DOME VALVE
Filed Jan. 18, 1945  2 Sheets-Sheet 2
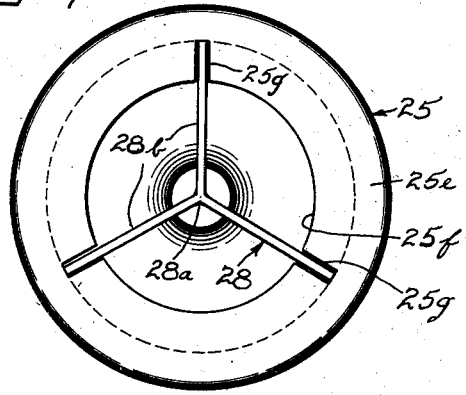
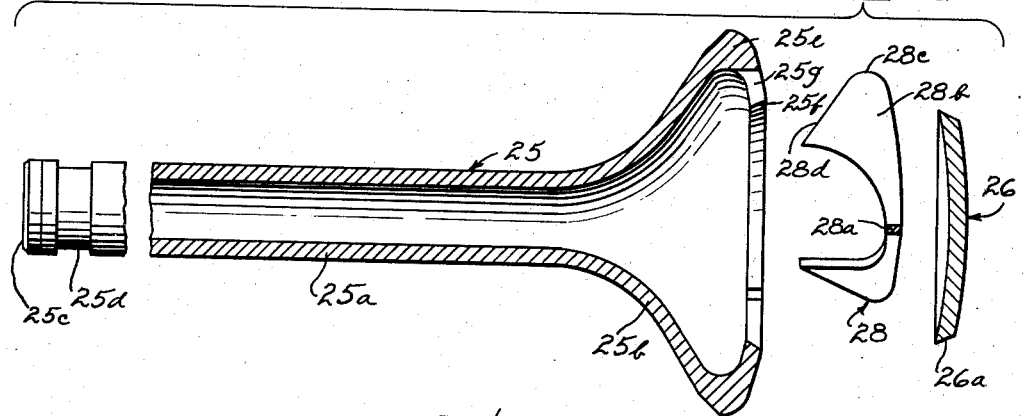
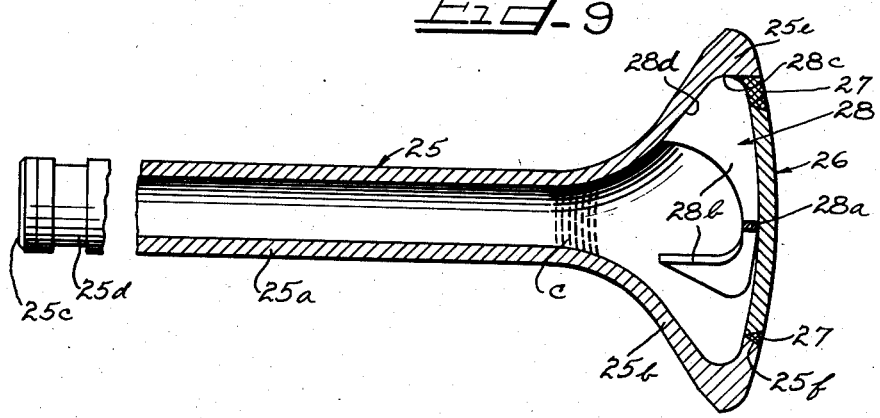
INVENTOR
Robert E. Cummings Patented Apr. 6, 1948

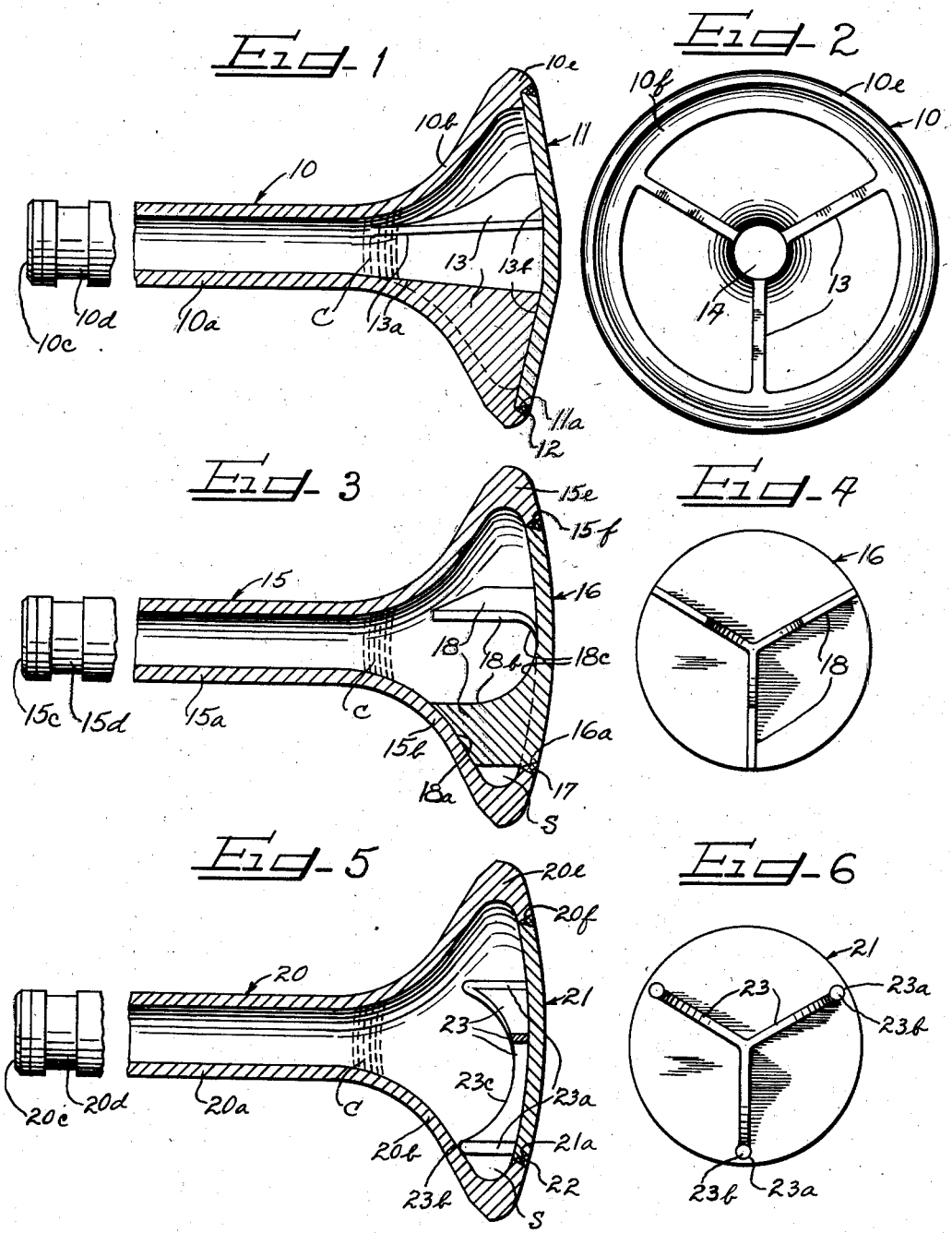

2,439,240

UNITED STATES PATENT OFFICE 2,439,240

BRACED HEAD DOME VALVE

Robert E. Cummings, University Heights, Ohio, assignor to Thompson Products, Inc., Cleveland, Ohio, a corporation of Ohio Application January 18, 1945, Serial No. 573,445

12 Claims. (Cl. 123—188)

This invention relates to valves having braced head portions capable of withstanding high external pressures.

Specifically this invention deals with hollow coolant-filled poppet valves having thin-walled head domes reinforced with braces that are bottomed on the neck portion of the valve head.

The high compression ratios, explosion pressures, and motor temperatures in modern internal combustion engines such as aircraft engines impart a severe strain on the head dome of the poppet valves in the engine. In order that the coolant in the valves may efficiently dissipate heat from the head portion of the valve, it is highly desirable to provide a relatively thin-walled head dome. Such thin-walled head domes, if unsupported across their entire span, are not capable of withstanding the high pressures to which they are subjected in operation. As a result, collapse of thin-walled head domes has been encountered.

The present invention now provides braced head domes for hollow poppet valves. The head dome braces can be integral with the valve body, or integral with the valve head, or separate from both the valve body and the valve head. The braces are bottomed on the neck of the valve and preferably are in the form of thin-walled fins extending between the valve neck and the head dome at spaced intervals around the hollow interior of the valve head. Such fins also serve to increase the heat dissipating capacity of the valve head, since the fins are in intimate contact with the head walls and also in intimate contact with the coolant.

The valve assemblies of this invention are preferably made with valve bodies having hollow stem portions closed at the tip ends and outwardly flared valve neck portions open at the head dome part for receiving coolant. The head dome is a separate piece welded into the open end of the head part of the body. In such constructions the head dome braces can be integral with the head dome or integral with the valve body. Alternatively the brace can be separate from both the valve body and the head dome. This arrangement permits the use of cast head domes with forged bodies containing forged ribs as well as the use of cast head domes with cast ribs and a forged body or, if desired, a cast head with a forged body and a separate machined rib or brace.

It is, then, an object of this invention to provide valve assemblies with braced valve head domes.

A further object of this invention is to provide valve assemblies with braces for reinforcing the dome of the valve against externally applied pressures.

A further object of the invention is to provide hollow poppet valves with braced head domes wherein the dome braces are bottomed on the neck of the valve head.

A still further object of the invention is to provide a poppet valve composed of a body having an open hollow head portion containing ribs extending radially inward from the neck of the valve together with a dome closing the open end of the valve body and bottomed on the ribs.

A still further object of the invention is to provide a poppet valve with a hollow head assembly containing a brace extending between the dome of the valve and the neck of the valve head.

A still further object of this invention is to provide poppet valves with hollow body portions closed by head domes having braces thereon which are bottomed on the neck of the body portions.

A still further object of this invention is to provide a hollow coolant-filled poppet valve having a thin-walled head dome braced against collapse by ribs or fins that are bottomed on the neck of the valve.

Other and further objects of this invention will be apparent to those skilled in the art from the following detailed description of the annexed sheets of drawings which, by way of preferred examples only, illustrate several embodiments of the invention.

On the drawings:

Figure 1 is a broken longitudinal cross-sectional view, with a portion in side elevation, of one form of braced hollow poppet valve according to this invention.

Figure 2 is a top plan view of the valve of Figure 1 with the head dome removed.

Figure 3 is a view similar to Figure 1 illustrating a second form of braced hollow poppet valve according to this invention.

Figure 4 is a bottom plan view of the head dome of the valve of Figure 3.

Figure 5 is a view similar to Figures 1 and 3 illustrating a third form of braced hollow poppet valve according to this invention.

Figure 6 is a view similar to Figure 4 illustrating the head dome for the valve of Figure 5.

Figure 7 is a top plan view of a fourth form of braced hollow poppet valve according to this invention with the head dome removed.

Figure 8 is an exploded view with parts in longitudinal cross section, illustrating the separate valve body, brace, and head dome shown in assembled relation in Figure 9.

Figure 9 is a broken longitudinal cross-sectional view, with a portion in side elevation, of a hollow poppet valve made from the parts shown in Figures 7 and 8.

As shown on the drawings:

In Figure 1 the reference numeral 10 designates generally the main hollow body portion 10 of the first form of valve according to this invention. This main hollow body portion includes a hollow stem 10a with an outwardly flaring tulip end or valve neck 10b. The tip end of the stem 10a is closed as at 10c and a groove 10d is provided in the closed end of the stem for receiving a valve spring retainer lock (not shown). The valve neck portion 10b of the body 10 has an upstanding rim end 10e with a countersunk face 10f providing a recess which receives a thin-walled head dome 11. This head dome has a peripheral edge 11a beveled back from the side wall of the recess 10f to cooperate therewith for forming a V-shaped groove. Welding metal is puddled into this V-shaped groove to form a welded bond 12 integrally affixing the head dome to the valve body.

The neck 10b of the valve body 10 has integral ribs or fins 13 extending radially inward therefrom and spaced apart 120° as shown in Figure 2. The three ribs or fins 13 thus provided terminate in spaced relation from each other at their inner ends as shown in Figure 2 to provide an opening 14 continuing the bore of the hollow stem 10a up to the head dome 11 and thereby simplifying the insertion of tools for finishing the bore of the stem 10a. These fins 13 extend down into the throat of the valve as illustrated at 13a in Figure 1 and extend up to top edges 13b having the same contour as the bottom face of the head dome 11 and bottoming this bottom face of the head dome.

Prior to welding the head dome 11 into the recess 10f of the body 10, coolant C, such as metallic sodium, is introduced into the body through the open head end thereof to partly fill the body. The finished poppet valve of Figure 1 thus has a thin-walled head dome 11 braced from its periphery inwardly to its central portion at three equally spaced areas. The braces are formed integral with the neck portion of the valve body and extend inwardly into the hollow head chamber of the valve to also serve as heat-dissipating fins.

In the second form of the invention, illustrated in Figure 3, a hollow main valve body 15 has a hollow tubular stem portion 15a with an outwardly flaring tulip end or valve neck portion 15b. The tubular stem portion 15a has a closed end 15c with a valve spring retainer lock groove 15d therein. The valve neck portion 15b has an upstanding rim end 15e with an inwardly extending head wall 15f terminating in a beveled edge defining an open mouth for the valve body.

A head dome 16 has a beveled peripheral edge 16a cooperating with the edge of the wall 15f to provide a V-shaped groove for receiving welding metal 17 to form a welded bond integrally uniting the head dome with the valve body.

The head dome 16 has three integral depending fins or ribs 18 spaced at 120° intervals therearound. Each rib 18 has a bottom edge 18a shaped to the contour of the valve neck 15b so as to have snug seating engagement with the neck wall as shown in Figure 3. Each fin or rib 18 extends inwardly from the periphery of the head dome 16 to an inner edge 18b spaced radially outward from the tubular stem portion 15a of the valve body and then converging to provide curved arches 18c connecting these inner edges 18b with the center of the head dome.

The outer edges of the fins 18, as shown in Figure 3, terminate short of the inner edge of the upstanding rim portion 15e of the valve body to provide spaces such as S for circulation of cooling fluid around the fins.

As in the first form of the invention, illustrated in Figures 1 and 2, the valve body 15 of Figure 3 is first partially filled with coolant C before the head dome 16 is welded into position. In this second form of the invention the head dome carries integral depending ribs or fins which are bottomed on the neck of the valve body along an area equivalent in length to the width of the fins, since the bottom edges 18a of the fins are contoured to fit the neck walls along their entire length.

In the third form of the invention, illustrated in Figure 6, there is provided a poppet valve having a hollow body 20 with a tubular stem portion 20a and an outwardly flaring tulip end or neck portion 20b. As in the valves of Figures 1 and 3, the tubular stem portion 20a has a closed end 20c with a retainer lock groove 20d therearound and the neck 20b has an upstanding rim portion 20e with an inwardly extending top wall 20f having a beveled edge defining an inlet mouth to the interior of the body.

A thin-walled head dome 21 has a beveled peripheral edge 21a cooperating with the edge of the wall section 20f to provide a V-shaped groove which receives welding metal 22 for bonding the head dome to the valve body. The head dome 21 has an integral depending brace composed of three legs 23 spaced 120° apart. These legs 23 have thickened outer ends 23a providing rounded bottom 23b arranged to seat on localized points of the valve neck 20b. The legs or fins 23 have curved bottom edges 23c providing arches extending from the rounded ends 23b to the center of the head dome.

In the third form of the invention, illustrated in Figure 5, the head dome 21 is braced by three integral depending fins which only have point contact with the valve neck 20b instead of having elongated area contact as in Figure 3.

The thickened ends 23a of the ribs or fins are spaced inwardly from the inside wall defining the upstanding rim 20e of the valve to provide spaces S around which the coolant C in the valve can flow in the same manner as described in connection with Figure 3.

In the fourth embodiment of the invention, shown in Figures 7 to 9, a hollow main valve body 25 having a hollow tubular stem portion 25a and an outwardly flared tulip end or neck portion 25b has the tip end of the stem portion enclosed as at 25c and has a groove 25d around the closed end 25c. The neck portion 25b has an upstanding rim end 25e with an inturned wall overlying the head cavity and having a beveled inner edge 25f providing a reduced-diameter opening to the valve cavity. The overhanging wall has three grooves 25g extending inwardly from the inner edge 25f at equally spaced intervals around the wall.

The opening defined by the beveled wall 25f of the valve body 25 is closed by a head dome 26 with a beveled peripheral edge 26a cooperating with the edge 25f to form a V-shaped groove adapted to receive welding metal 27 for forming a welded bond integrally uniting the head dome to the valve body.

A separate brace 28 is provided for bracing the head dome from the valve neck. This brace 28 has a shallow central point 28a with three legs 28b radiating therefrom and increasing in depth to the outer edges thereof. The legs have rounded outer end portions 28c contoured to snugly engage the rounded inner wall of the body rim 25e. The rounded ends 28c merge into the inclined bottom edges 28b contoured to snugly engage the inner wall of the neck 25b.

Since the outer end portions of the brace 28 cannot fit within the reduced-diameter opening defined by the edge 25f, these outer ends are seated in the valve through the slots 25g. As shown in Figure 9, the outer edges 28c have snug fitting engagement with the inner wall of the rim portion 25e while the bottom edges 25d have snug fitting engagement with the inner wall of the neck 25b.

The brace 28 is held against rotation in the valve by peening the slot-defining walls 25g against the outer edges 28c after the brace has been inserted in the slots and the slots are then closed with the same welding metal 27 that bonds the head dome to the valve body.

The valve body 25 is partially filled with coolant C prior to closing the open head end thereof with the head dome 26 and preferably prior to insertion of the brace member 28.

The head dome 26 is firmly seated on the top edges of the brace legs 28b and, since the bottom edges of these legs are seated on the valve neck 25b the head dome is amply braced against inward deflection or collapse.

From the above descriptions it will be understood that this invention now provides hollow poppet valves having head domes which are braced by fins, ribs or the like that are bottomed on the neck of the valve. The braced head dome can be quite thin and will still effectively resist high pressures such as occur in the combustion chamber of internal combustion engines operating at high compression ratios. In addition, the fins or ribs forming the braces for the valves of this invention serve as effective heat radiators. Since the valves of this invention are partially filled with coolant that is liquid at operating temperatures, such as metallic sodium, the heat-radiating fins or ribs are in intimate heat-exchange relationship with the coolant and heat from the head portion of the valve is quickly dissipated down through the stem portion of the valve.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A hollow poppet valve which comprises a main body portion having a hollow neck, a plurality of inwardly projecting ribs integral with said neck, and a head dome for said valve bottomed on said ribs and integrally bonded to said neck for closing the open end of the neck portion.

2. A hollow poppet valve comprising a main body part having a tubular stem-defining portion with a closed stem tip end and an outwardly flaring open valve neck end, said outwardly flaring valve neck end having three inwardly projecting integral ribs therein spaced at 120° intervals therearound and terminating adjacent the inner surface of the stem portion, said ribs having elongated upper ends lying in the mouth of the neck portion, and a head dome bottomed on said elongated upper ends of the ribs and welded to the neck portion for closing the open mouth thereof.

3. A coolant filled hollow poppet valve comprising a main body member having a hollow neck portion with an open mouth, and a relatively thin walled head dome closing said open mouth of the neck portion having integral depending compression load carrying ribs bottomed on the neck portion of the valve for bracing the head dome against inward collapse.

4. A poppet valve comprising a main body member having a hollow tubular stem and an outwardly flaring tulip end defining a valve neck with an open mouth, a thin walled head dome closing said open mouth and having integral depending compression load carrying ribs bottomed on said neck portion along a plurality of elongated areas thereof, said ribs stiffening said thin walled head dome and bracing the dome against inward collapse.

5. A coolant filled poppet valve comprising a main body member having a hollow neck portion with an open mouth at the head end thereof, and a head dome closing said open mouth of the neck portion having a plurality of depending compression load carrying legs firmly bottomed at spaced points on the neck portion of the valve for reinforcing the head dome against inward collapse.

6. A poppet valve comprising a main body member with a hollow neck portion having an inturned head flange defining an opening to the interior of the body, said inturned head flange having an outwardly flaring beveled opening defining edge, a thin head dome seated in said opening having an inwardly flaring beveled edge cooperating with said outwardly flaring beveled edge of the inturned flange to define a V-groove, welding metal filling said V-groove bonding said head dome to said inturned flange, and a compression load carrying stiff head dome brace extending between and acting on said head dome and the neck of the valve in said valve body for resisting inward collapse of the head dome.

7. A coolant filled poppet valve comprising a main body having an outwardly flaring hollow neck portion with an inturned head flange defining an opening at the end of the neck, a thin head dome closing the open end of the neck portion in alignment with said inturned flange, and depending compression load carrying ribs on said head dome firmly bottomed on said neck portion, said ribs terminating radially inward of said head flange, to fit in said opening defined by said head flange and to cooperate with said neck portion for providing a continuous path under the head flange around the ribs.

8. A poppet valve comprising a main body member having a hollow neck portion with an inturned head-defining flange providing an opening in the interior of the body, said flange having a plurality of radial slots therein, a brace bottomed on said neck portion of the body having legs seated in said slots, a head dome closing said opening bottomed on said brace, and welding material integrally connecting said head dome with said head flange and closing said slots.

9. A hollow poppet valve comprising a main body member having a hollow neck portion with an open mouth, and a thin head dome closing said open mouth and having three integral depending compression load carrying ribs spaced at 120° intervals therearound firmly bottomed on the neck portion of the valve for bracing the head dome against inward collapse.

10. In a hollow head coolant-filled poppet valve having a neck portion and a relatively thin-walled head dome, the improvement which comprises compression-load carrying brace structure in load-carrying relation between said dome and neck and supported by said neck, said brace structure being localized in said hollow head to leave substantially the entire head cavity free for circulation of coolant therein.

11. In a hollow head poppet valve having a neck portion and a relatively thin-walled head dome, the improvement which comprises a compression load-carrying head dome brace in said hollow head supported by said neck portion of the valve and bridging substantially the entire span of the head dome in supporting relation to said dome, said brace comprising a plurality of thin fins of substantial radial length extending between said head dome and valve neck and spaced one from another in substantially spoke formation and firmly bottomed on said neck to prevent inward collapse of the thin-walled head dome.

12. In a hollow head coolant-filled poppet valve having a neck portion and a relatively thin-walled head dome, the improvement which comprises a plurality of thin members between the head dome and neck and supported by said neck to constitute compression load brace means for substantially the entire span of the head dome in supporting relation to prevent inward collapse of the head dome while leaving substantially the entire head cavity free for coolant circulation.

ROBERT E. CUMMINGS.

REFERENCES CITED

The following references are of record in the file of this patent:

UNITED STATES PATENTS

| Number | Name | Date |
| --- | --- | --- |
| 1,294,416 | Dady | Feb. 18, 1919 |
| 2,218,983 | Daisley | Oct. 22, 1940 |
| 2,238,628 | Daisley | Apr. 15, 1941 |

FOREIGN PATENTS

| Number | Country | Date |
| --- | --- | --- |
| 440,206 | Great Britain | Dec. 23, 1935 |